(12) United States Patent
Cabourg et al.

(10) Patent No.: US 9,260,175 B2
(45) Date of Patent: Feb. 16, 2016

(54) SEPARATING ELEMENT FOR A PLATFORM CABIN COMPRISING A PUSH ROD MECHANISM FOR MOVING A LEAF

(75) Inventors: Frédéric Cabourg, Puteaux (FR); Thierry Capetta, Saint-Remy les Chevreuse (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 13/554,731

(22) Filed: Jul. 20, 2012

(65) Prior Publication Data

US 2013/0019536 A1 Jan. 24, 2013

(30) Foreign Application Priority Data

Jul. 22, 2011 (FR) .................................. 11 02298

(51) Int. Cl.
| | |
|---|---|
| B64C 1/14 | (2006.01) |
| B64D 11/00 | (2006.01) |
| E05B 83/04 | (2014.01) |
| E05F 11/52 | (2006.01) |
| E05B 53/00 | (2006.01) |
| E05C 17/60 | (2006.01) |
| E05D 15/56 | (2006.01) |
| E05F 15/649 | (2015.01) |
| E05F 15/665 | (2015.01) |
| E05B 81/28 | (2014.01) |
| E05B 63/24 | (2006.01) |
| E05B 81/90 | (2014.01) |

(52) U.S. Cl.
CPC .......... *B64C 1/1438* (2013.01); *B64D 11/0023* (2013.01); *E05B 53/00* (2013.01); *E05B 83/04* (2013.01); *E05C 17/60* (2013.01); *E05D 15/56* (2013.01); *E05F 11/52* (2013.01); *E05F 15/649* (2015.01); *E05F 15/665* (2015.01); *E05B 63/24* (2013.01); *E05B 81/28* (2013.01); *E05B 81/90* (2013.01); *E05Y 2201/478* (2013.01); *E05Y 2800/205* (2013.01); *E05Y 2900/404* (2013.01)

(58) Field of Classification Search
USPC ........... 49/226, 227, 232, 233, 234, 235, 404; 244/129.4, 129.5
See application file for complete search history.

(56) References Cited

U.S. PATENT DOCUMENTS

| | | | | |
|---|---|---|---|---|
| 125,375 | A * | 4/1872 | Betts | 49/233 |
| 200,341 | A * | 2/1878 | Reed | 49/233 |
| 347,620 | A * | 8/1886 | Kopecky | 49/232 |
| 352,080 | A * | 11/1886 | Bullock | 49/232 |
| 447,042 | A * | 2/1891 | Fidler | 49/233 |
| 639,345 | A * | 12/1899 | Bradford | 49/233 |

(Continued)

OTHER PUBLICATIONS

Patentability Search Report issued on Oct. 26, 2011 for French Application No. 1102298.

*Primary Examiner* — Katherine Mitchell
*Assistant Examiner* — Shiref Mekhaeil
(74) *Attorney, Agent, or Firm* — Davidson, Davidson & Kappel, LLC

(57) ABSTRACT

A separating element for a platform cabin is provided. The separating element comprises: at least one stationary partition, delimiting a passage defining a circulation axis inside the cabin; at least one leaf, mounted transversely movable relative to the circulation axis between a closed position, in which it extends through the passage, and an open position, in which it is positioned at least partially spaced away from the passage; and means for moving the or each leaf between the closed position and the open position thereof, the or each leaf being adapted to move along the plane transverse to the circulation axis.

20 Claims, 12 Drawing Sheets

(56) References Cited

U.S. PATENT DOCUMENTS

| | | | | |
|---|---|---|---|---|
| 769,997 | A * | 9/1904 | Flinner | 49/233 |
| 881,532 | A * | 3/1908 | Bauer | 49/233 |
| 1,047,368 | A * | 12/1912 | Baxter | 49/233 |
| 1,343,023 | A * | 6/1920 | Bach | 49/117 |
| 1,685,506 | A * | 9/1928 | Smith | 49/233 |
| 1,818,482 | A * | 8/1931 | Hunt | 49/233 |
| 1,963,415 | A * | 6/1934 | Mattson | 49/233 |
| 2,520,053 | A * | 8/1950 | Parsons | 74/110 |
| 3,136,538 | A * | 6/1964 | Kessner et al. | 49/117 |
| 4,911,219 | A * | 3/1990 | Dalrymple | 160/118 |
| 4,989,808 | A * | 2/1991 | Spraggins et al. | 244/118.5 |
| 5,526,659 | A * | 6/1996 | Takimoto | 70/99 |
| 5,573,287 | A * | 11/1996 | Takimoto | 292/29 |
| 6,186,444 | B1 * | 2/2001 | Steel | 244/129.5 |
| 8,038,100 | B2 * | 10/2011 | Osborne et al. | 244/129.5 |
| 2005/0211848 | A1 * | 9/2005 | Rouyre | 244/129.4 |
| 2009/0078824 | A1 * | 3/2009 | Osborne et al. | 244/119 |

* cited by examiner

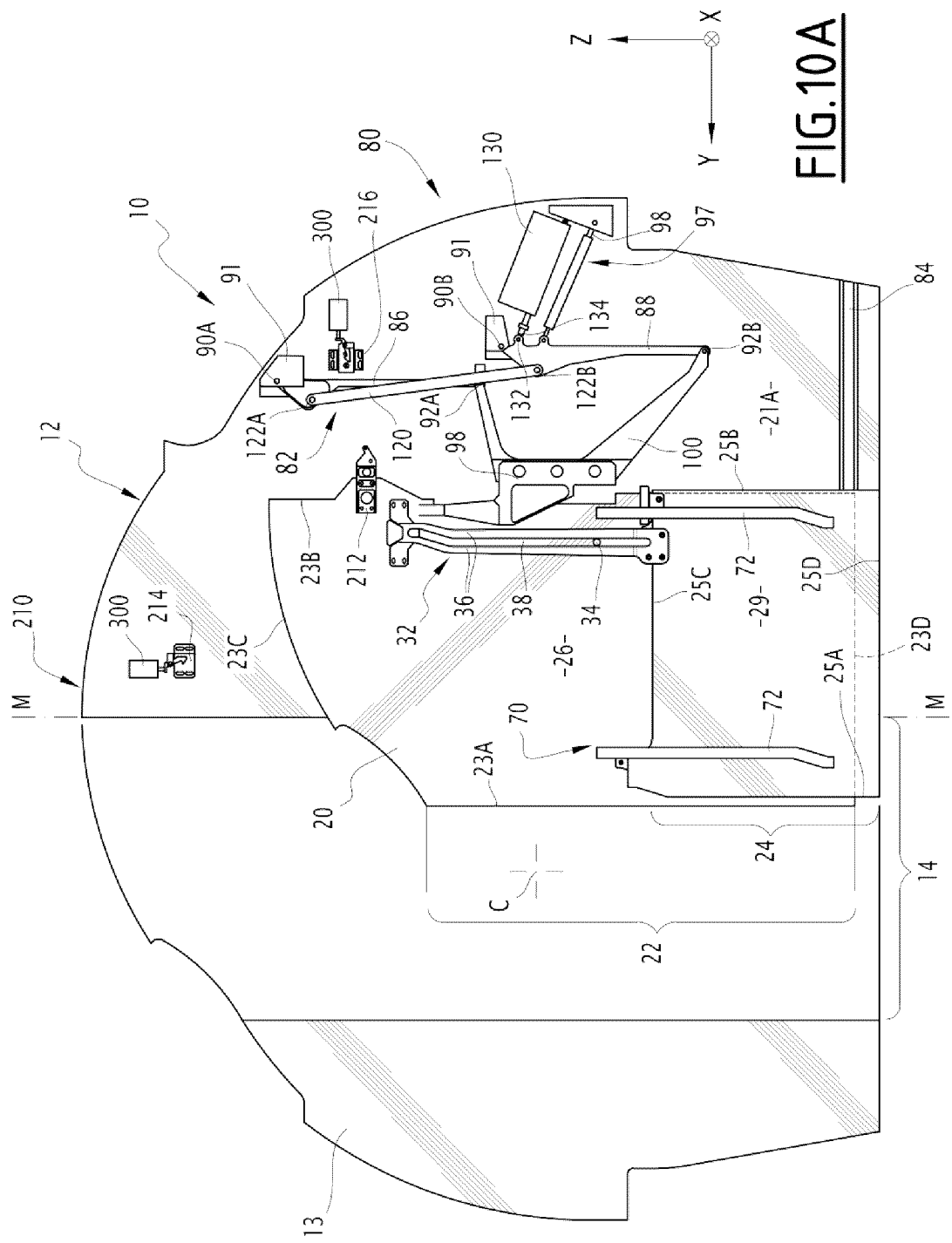

SEPARATING ELEMENT FOR A PLATFORM CABIN COMPRISING A PUSH ROD MECHANISM FOR MOVING A LEAF

CROSS-REFERENCE TO RELATED APPLICATIONS

This application claims the benefit of French Application No. 11 02298 filed Jul. 22, 2011, which is hereby expressly incorporated by reference in its entirety.

BACKGROUND OF THE INVENTION

1. Field of the Invention

The present invention relates to a separating element for a platform cabin, of the type comprising:
- at least one stationary partition, delimiting a passage defining a circulation axis inside the cabin,
- at least one leaf, mounted transversely movable relative to the circulation axis between a closed position, in which it extends through the passage, and an open position, in which it is positioned at least partially spaced away from the passage, and
- means for moving the or each leaf between the closed position and the open position thereof, the or each leaf being adapted to move along the plane transverse to the circulation axis.

"Platform" refers both to an aircraft and boat or, more generally, any vehicle having an enclosure that is at least partially cylindrical.

2. Description of the Related Art

Such separating elements are known. Thus for example, separating elements are known for an aircraft cabin comprising two stationary partitions defining a circulation passage through the aircraft between them, and a door formed from a single, large leaf. The leaf is movably mounted on one of the stationary partitions between a closed position, in which it extends through the passage, and an open position, in which it is positioned spaced away from the passage, retracted inside the stationary partition. Slide means allow the leaf to move between the open and closed positions thereof.

However, these separating elements are not fully satisfactory. In fact, in these separating elements, the travel of the leaf is limited by the fuselage of the aircraft, due to the substantially cylindrical configuration thereof. This limited travel restricts the width of the passage when said separating element is installed in a narrow fuselage airplane, such as a business airplane.

Furthermore, such separating elements are particularly heavy and, as a result, expensive to manufacture and install in an aircraft cabin.

SUMMARY OF THE INVENTION

One aim of the invention is to propose a cabin separating element with an optimized weight relative to the opening travel of the leaf. Other aims of the invention are to improve the rigidity of the separating element, simplify the manufacture and maintenance thereof, maximize the width of the leaf, and increase the compactness of the movement means of the leaf.

To that end, the invention relates to a separating element of the aforementioned type, in which the movement means comprise at least one movement push rod, articulated by a first point of articulation to a point of the partition, and by a second point of articulation to a point jointly movable with the leaf portion, and in which, in at least a first position of the leaf, the first and second points of articulation define a vertical axis.

According to preferred embodiments of the invention, the separating element comprises one or more of the following features:
- the first position of the leaf in which the first and second points of articulation are vertically aligned is a first intermediate position of the leaf between the closed and open positions thereof;
- the mechanism comprises two movement push rods, the points of articulation of each movement push rod being spaced apart from the points of articulation of the other movement push rod, and, in at least one second position of the leaf, the first and second points of articulation of the two movement push rods are aligned with one another;
- the second position of the leaf in which the first and second points of articulation of the two push rods are aligned is a second intermediate position of the leaf between the closed and open positions thereof;
- between the closed position and the second intermediate position, the second points of articulation are situated on a first side of the line passing through the first points of articulation and, between the second intermediate position and the open position, the second points of articulation are situated on the second side of the line passing through the first points of articulation;
- the first points of articulation of the movement push rods are vertically offset relative to one another;
- the movement means comprise a coordinating push rod articulated to each movement push rod;
- each movement push rod is articulated to the coordinating push rod by a third point of articulation, and, for each movement push rod, the third point of articulation is situated spaced away from a line passing through the first and second points of articulation of the movement push rod;
- the first and third points of articulation together define the apices of a parallelogram;
- one of the first and second points of articulation has a degree of freedom perpendicular to the hinge pin, while advantageously being formed by the cooperation of a finger with an oblong opening;
- the movement means comprise an actuator;
- the or each first point of articulation is a stationary point of the stationary partition;
- the width of the leaf, defined horizontally in a plane transverse to the circulation axis, is comprised between 20% and 30% of the width of the separating element, defined horizontally in a plane transverse to the circulation axis;
- the separating element comprises a system for locking the leaf in the open position and in the closed position, the locking system comprising a movable locking member secured to the leaf and two stationary locking members secured to the partition, one stationary locking member cooperating with the movable locking member to lock the leaf in the open position, and the other stationary locking member cooperating with the movable locking member to lock the leaf in the closed position;
- the stationary locking members have identical structures, the structure of each stationary locking member being oriented differently from that of the other stationary locking member;
- the locking system comprises a motorized actuating device for each stationary locking member;

the or each leaf comprises first and second leaf portions, movable relative to one another, and relative guide means for guiding the first leaf portion relative to the second leaf portion; and the separating element comprises two stationary partitions delimiting a passage between them, and a single leaf to obstruct the passage, the circulation axis advantageously being transversely offset relative to the middle plane of the separating element extending substantially parallel to the circulation axis.

BRIEF DESCRIPTION OF THE DRAWINGS

Other features and advantages of the invention will appear upon reading the following description, provided solely as an example and done in reference to the appended drawings, in which:

FIG. 10A is a view similar to FIG. 1, the leaf being in another intermediate position.

DETAILED DESCRIPTION OF CERTAIN ILLUSTRATIVE EMBODIMENTS

Figure 1:
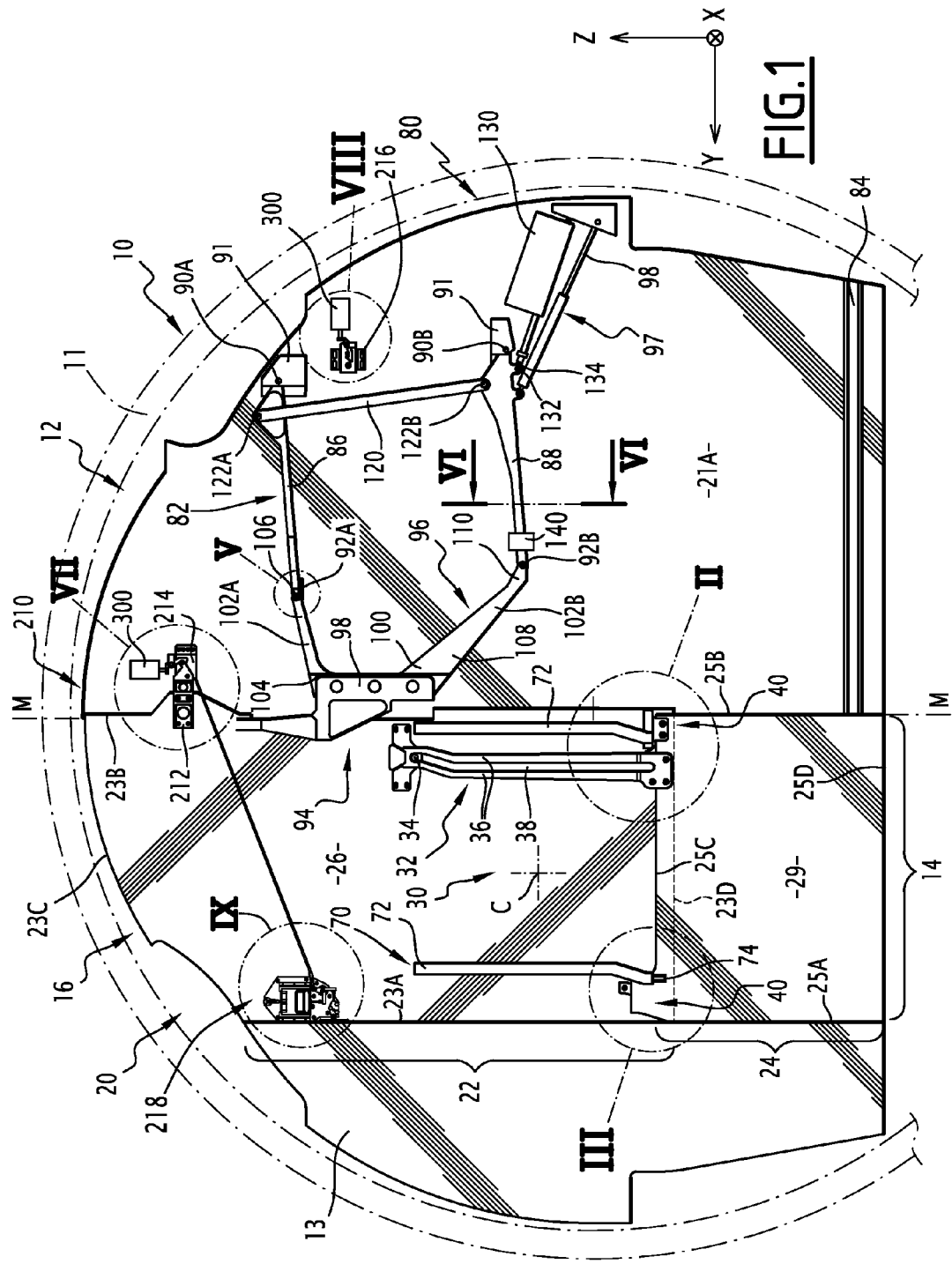
FIG. 1 is a rear elevation view, in partial cross-section, of the separating element according to the invention, a leaf of the separating element being in the closed position.

The separating element 10, shown in FIG. 1, is an element for separating an aircraft cabin. It is intended to be installed inside the fuselage 11 of the aircraft, between the fuselage 11 and a cabin floor (not shown), transverse to the direction of extension of the fuselage 11, to separate the cabin into two compartments.

Hereafter, the orientation terms will be used in reference to the standard orientation of an aircraft, shown in the Figures, in which:

the X axis is a longitudinal axis and extends from the tail toward the nose of the aircraft, the Y axis is a transverse axis and extends from the right to the left of the aircraft, for an observer facing the nose of the aircraft, and the Z axis is a vertical axis and extends from bottom to top, the X and Y axes together defining a horizontal plane, the X and Z axes together defining a longitudinal plane, and the Y and Z axes together defining a transverse plane.

The width of the separating element 10, defined horizontally in the transverse plane, is substantially equal to the inner diameter of the fuselage. In particular, the width is defined as the greatest distance along the transverse axis Y separating two points of the separating element 10.

The separating element 10 comprises two stationary partitions 12, 13 delimiting a passage 14 between them, and a door 16 to selectively obstruct the passage 14 for free the passage 14.

The passage 14 defines a circulation axis C inside the cabin, substantially combined with the longitudinal axis X.

The partitions 12, 13 are asymmetrical relative to a middle longitudinal plane M of the fuselage, relative to which the fuselage is substantially symmetrical. A first stationary partition 12 extends transversely from the fuselage to the vicinity of the middle longitudinal plane M. The second stationary partition 13 extends transversely in the other half of the fuselage, between the fuselage and the passage 14. The circulation axis C is thus transversely offset relative to the middle longitudinal plane M.

The middle longitudinal plane M also constitutes a middle longitudinal plane of the separating element 10.

In the illustrated example, the first stationary partition 12 is on the right of the passage 14, and the second stationary partition 13 is on the left of the passage 14.

The door 16 is made up of a single leaf 20.

The leaf 20 is movably mounted on the partition 12 between a closed position, in which the leaf 20 extends through the passage 14, and an open position, in which it is positioned spaced away from the passage 14.

The leaf 20 is adapted to move along a transverse plane between the open and closed positions thereof. In other words, the leaf 20 is adapted to be oriented perpendicular to the longitudinal axis X along its entire movement between the open and closed positions thereof.

The stationary partition 12 comprises a front partition panel 21A and a rear partition panel 21B (FIG. 6) defining a space 18 between them (FIG. 6) for receiving the leaf 20 in the open position.

The leaf 20 comprises a first upper portion 22 and a second lower portion 24, the two portions 22, 24 being mounted vertically movably relative to one another.

Figure 4:
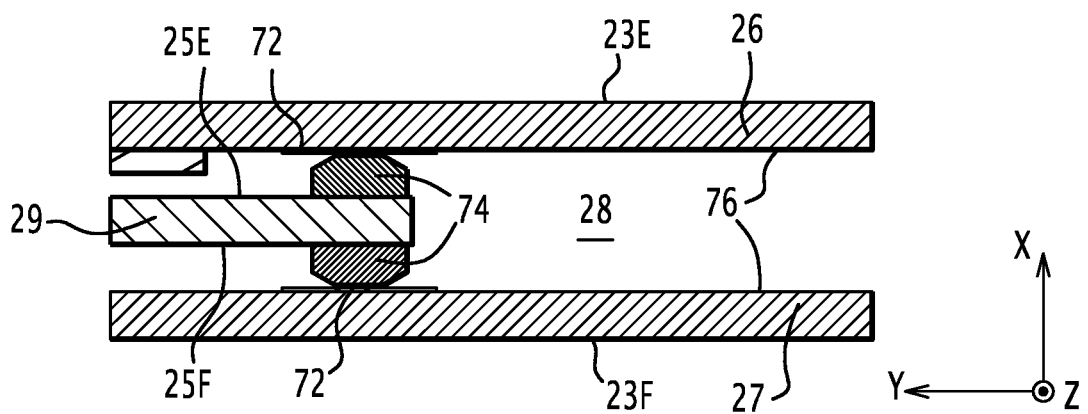
FIG. 4 is a cross-sectional view along a first plane marked IV in FIG. 3.

Each leaf portion, 22, 24, respectively, comprises an inner lateral edge 23A, 25A, respectively, oriented toward the partition 13, an outer lateral edge 23B, 25B, respectively, oriented toward the partition 12, an upper edge 23C, 25C, respectively, a lower edge, 23D, 25D, respectively, a front surface 23E, 25E, respectively (FIG. 4), and a rear surface 23F, 25F, respectively (FIG. 4).

The two leaf portions 22, 24 are also movably mounted transversely relative to one another, so as to allow the vertical alignment of the inner lateral edges 23A, 25A when the leaf 20 is in the closed position. This aspect is described in more detail later in the description.

The width of the leaf 20 is defined as the smallest horizontal distance between the inner 23A, 25A and outer 23B, 25B lateral edges of the leaf portions 22, 24. The width of the leaf 20 thus defined is for example comprised between 20 and 30% of the width of the separating element 10.

The first leaf portion 22 comprises a front panel 26 and a rear panel 27 (FIG. 4) defining a space 28 between them (FIG. 4) for receiving the second portion 24. The front panel 26 defines the front surface 23E of the first leaf portion 22, and the rear panel 27 defines the rear surface 23F of the first leaf portion 22.

The second leaf portion 24 comprises a single panel 29 defining both the front 25E and rear 25F surfaces of the leaf portion 24.

The leaf 20 comprises means 30 for relative vertical guiding of the first portion 22 in relation to the second portion 24. These vertical guiding means 30 are housed inside the space for receiving the second portion 24.

The vertical guiding means 30 comprise a slide 32, secured to the second leaf portion 24, and a guiding member 34, secured to the first leaf portion 22 and adapted to cooperate with the slide 32 to vertically guide the first leaf portion 22 relative to the second leaf portion 24. The slide 32 comprises two bars 36 elongated in a substantially vertical direction and parallel to one another. The bars 36 delimit a slit 38 between them for guiding the member 34. The member 34 is advantageously, as shown, a slug protruding rearward from the front panel 26 and received in the slit 38.

The vertical guiding means 30 also comprise means 40 for relative transverse shimming of the first leaf portion 22 relative to the second leaf portion 24.

Figure 2:
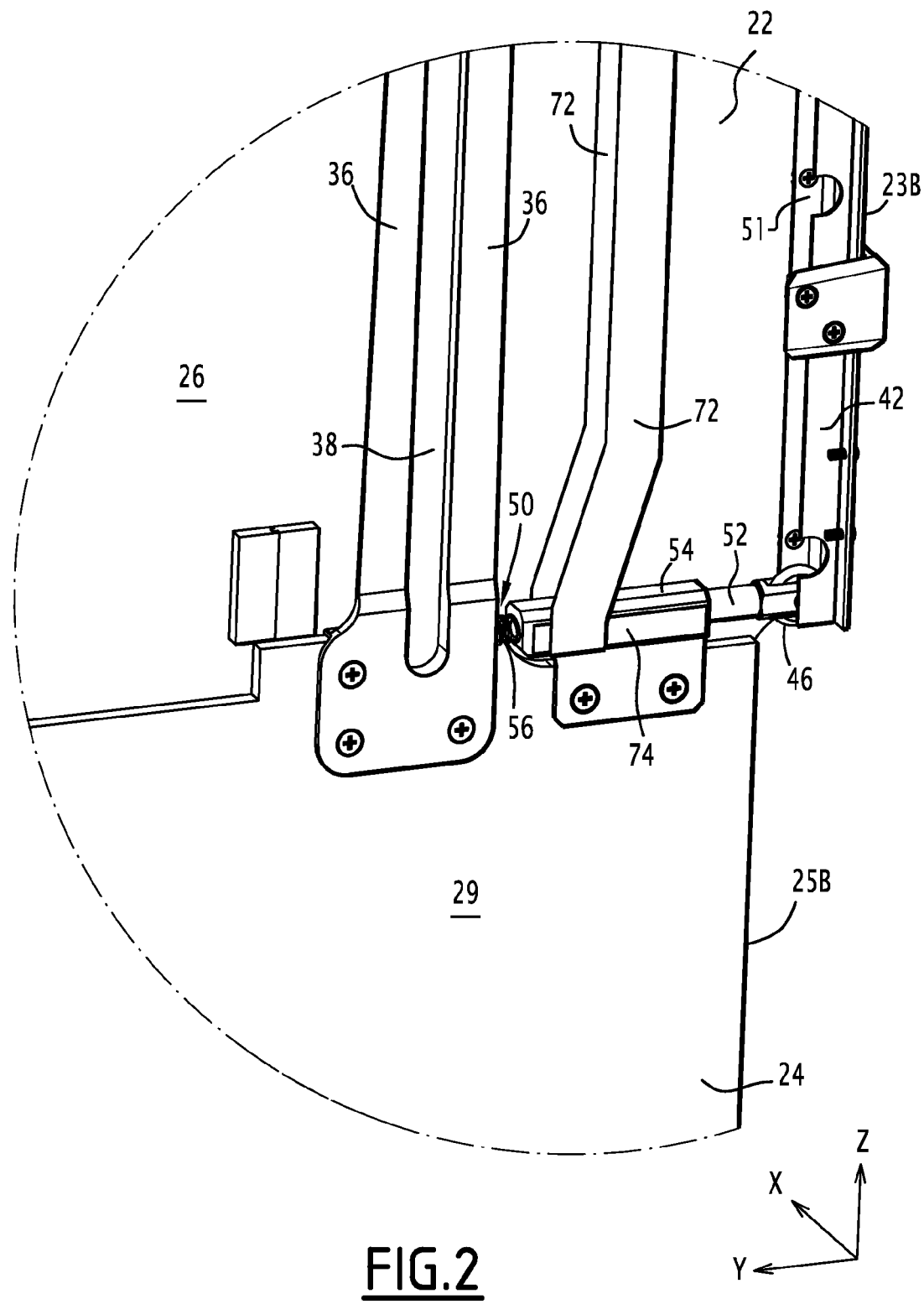
FIG. 2 is a view of a detail marked II in FIG. 1.
Figure 3:
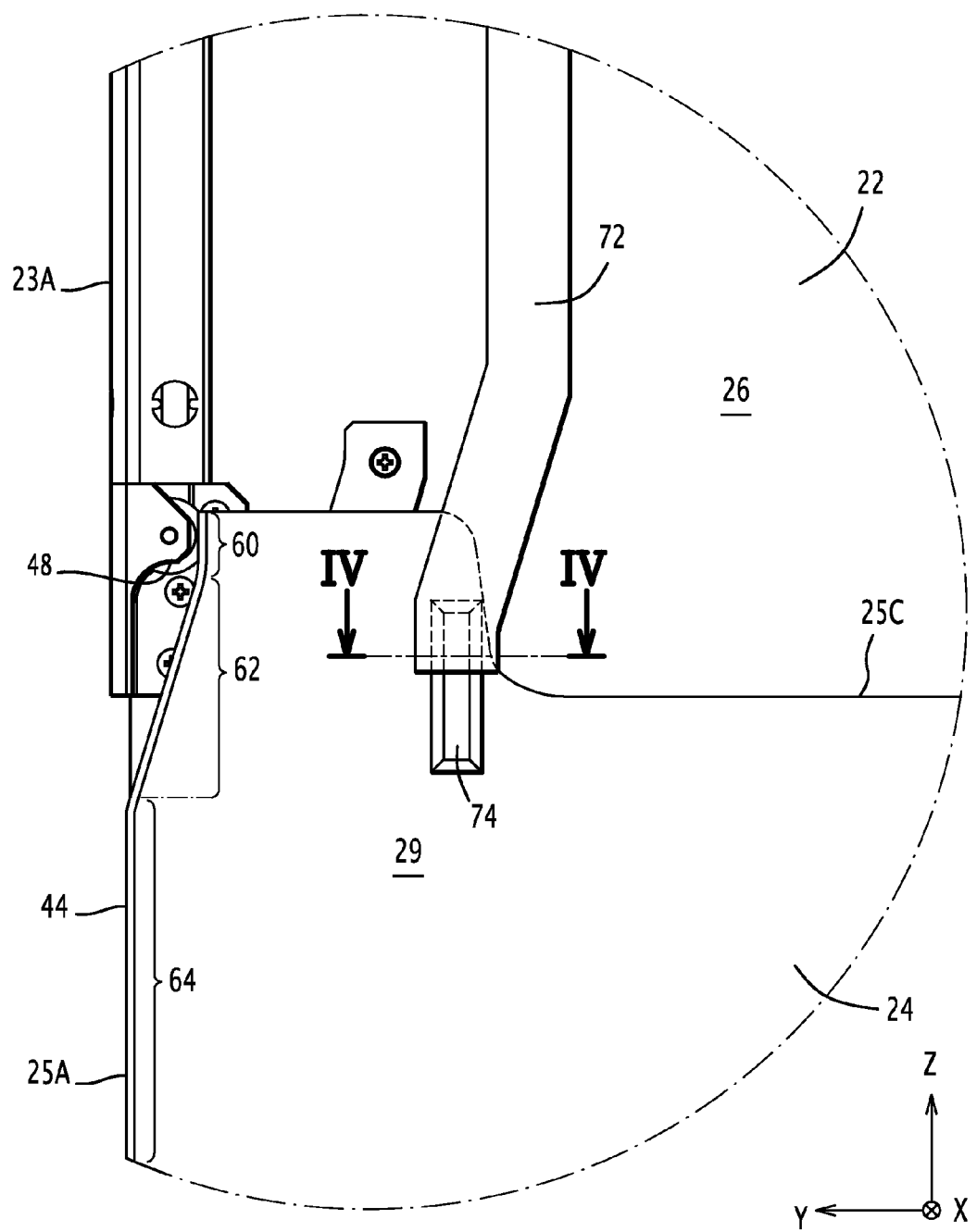
FIG. 3 is a view of a detail marked III in FIG. 1.

These shimming means 40 comprise, in light of FIGS. 2 and 3, two vertical guides 42, 44, two movement members 46, 48, and means 50 for returning one of the movement members 46, 48 to bear against the associated guide 42, 44.

Each guide 42, 44 is elongated in a substantially vertical direction. Each member 46, 48 is adapted to cooperate with a specific guide 42, 44.

As visible in FIG. 2, a first guide 42 is formed by a metal profile secured to the first leaf portion 22. In the illustrated example, the profile 42 is secured along the lateral edge 23B of the first leaf portion 22. It delimits a trench 51 oriented towards the inside of the first leaf portion 22.

The associated movement member 46 is made up of a first roller secured to the second leaf portion 24. It is received in the trench 51 and is adapted to roll inside the trench 51.

More specifically, the first roller 46 is mounted on a transverse arm 52, transversely movable inside a chamber 54 for guiding the arm 52 secured to the panel 29.

The return means 50 transversely stress the arm 52, toward the outside of the second leaf portion 24. In the illustrated example, the return means 50 are made up of a spring inserted between a transverse end (not shown) of the arm 52 and the stop surface 56 secured to the panel 29. The chamber 54 is fastened on the upper edge 25C of the second leaf portion 24.

As shown in FIG. 3, the second guide 44 is made up of a track formed in the lateral edge 25A of the second leaf portion 24, opposite the lateral edge 23B of the first leaf portion 22 along which the first guide 42 is fastened.

In the illustrated example, the guide 44 comprises an upper portion 60 oriented substantially vertically, an intermediate portion 62 inclined toward the lateral edge 25A, and a lower portion 64 oriented substantially vertically, parallel to the upper portion 60. The upper portion 60 is thus transversely offset towards the inside of the leaf portion 24 relative to the lower portion 64.

This offset is such that, when the movement member 48 bears against the upper portion 60, the inner lateral edges 23A, 25A of the two leaf portions 22, 24 are vertically aligned. Thus, when the leaf 20 is in the closed position, it has a satisfactory aesthetic appearance.

The associated movement member 48 is made up of a second roller secured to the first leaf portion 22 and adapted to roll on the track forming the second guide 44. The second roller 48 is mounted close to the lateral edge 23A of the first leaf portion 22. It is transversely stationary relative to the first leaf portion 22.

Under the effect of the bearing force of the first roller 46 against the profile 42, the second leaf portion 24 is stressed transversely away from the first leaf portion 22. Under the effect of this force, the second roller 48 is stressed bearing against the guide 44, and the bearing force of the second roller 48 against the guide 44 opposes the bearing force of the first roller 46 against the profile 42. Owing to this configuration, the roller 48 can therefore faithfully follow the guide 44, and the relative transverse position of the two leaf portions 22, 24 is completely controlled. The return means 50 make it possible to offset any manufacturing irregularities.

Alternatively, the two guides 42, 44 are secured to a same leaf portion 22, 24, the two movement members 46, 48 being secured to the other leaf portion 22, 24.

The vertical guide means 30 also comprise means 70 for relative longitudinal shimming of the first and second leaf portions 22, 24. These longitudinal shimming means 70 comprise, as shown in FIGS. 3 and 4, slip bands 72, secured to the first leaf portion 22, and skates 74, secured to the second leaf portion 24 and adapted to bear against the slip bands 72.

Each slip band 72 extends substantially vertically, along an inner surface 76 of the panel 26, 27 of the leaf portion 22. "Inner surface 76" refers to the surface of the panel 26, 27 oriented toward the space 28 for receiving the leaf portion 24 in the closed position of the leaf 20. The inner surface 76 of the front panel 26 is thus opposite the front surface 23E of the leaf portion 22, and the inner surface 76 of the rear panel 27 is opposite the rear surface 23F of the leaf portion 22.

The slip bands 72 are longitudinally aligned two by two. In other words, for each slip band 72 positioned along the inner surface 76 of a panel 26, 27, respectively, another slip band 72 is opposite it on the inner surface 76 of the opposite panel 27, 26. In the illustrated example, there are two pairs of slip bands 72.

Each skate 74 is placed on the front surface 25E or rear surface 25F of the leaf portion 24. Preferably, each skate 74 is placed close to the upper edge 25C of the leaf portion 24 such that, when the leaf 20 is in the open position, the skate 74 is inside the receiving space 28.

Each skate 74 is positioned opposite a slip band 72. Like the slip bands 72, the skates 74 are longitudinally aligned two by two, i.e. for each skate 74 positioned on a surface 25E, 25F of the leaf portion 24, another skate 74 is positioned on the other surface 25E, 25F, such that said two skates 74 are longitudinally aligned.

As shown in FIG. 4, the skates 74 are sized so that each skate 74 bears against the slip band 72 facing it. To that end, each skate 74 has a longitudinal thickness substantially equal to half the longitudinal thickness of the space 28, deducting the longitudinal thickness of the panel 29.

Preferably, there are at least six skates 74.

Each pair formed by a slip band 72 and the skate 74 facing it has a low coefficient of friction. In other words, the slip band 72 and the skate 74 of a same pair are adapted so that they can slide on one another without friction. Typically, the slip band 72 is made from aluminum and the skate 74 is made from Teflon®, or vice versa.

In this way, the leaf portions 22, 24 are in constant contact in the longitudinal direction X, which prevents any longitudinal travel of the second leaf portion 24 relative to the first leaf portion 22. Furthermore, the points of contact are limited and the friction at said points of contact is reduced, which provides good relative mobility of the two leaf portions 22, 24.

Returning to FIG. 1, the separating element 10 also comprises means 80 for moving the leaf 20 relative to the partition 12. These movement means 80 are housed inside the space for receiving the leaf 20 in the open position, formed in the partition 12.

According to the invention, the movement means 80 comprise a mechanism 82 for moving the first leaf portion 22, and a rail 84 for moving the second leaf portion 24.

The mechanism 82, the rail 84, respectively, is adapted to guide the translation of the first leaf portion 22, of the second leaf portion 24, respectively, along the transverse plane.

The mechanism 82 comprises two movement push rods 86, 88. Each push rod 86, 88 is articulated at a first point of articulation 90A, 90B to a stationary point of the partition 12, typically by means of a fitting 91, and at a second point of articulation 92A, 92B to a point jointly movable with the first leaf portion 22, by means of a connecting element 94.

The first points of articulation 90A, 90B are spaced apart from one another. Likewise, the second points of articulation 92A, 92B are spaced apart from one another.

Preferably, the first points of articulation 90A, 90B are stationary points of the stationary partition 12.

The first points of articulation 90A, 90B are vertically offset relative to one another, i.e. they are not positioned in a same horizontal plane. A first upper point of articulation 90A and a first lower point of articulation 90B are thus defined.

Furthermore, the first points of articulation 90A, 90B are offset transversely relative to one another, i.e. they are not positioned in a same vertical plane. In particular, the first lower point of articulation 90B is transversely offset to the right relative to the first upper point of articulation 90A.

The second points of articulation 92A, 92B are also vertically offset relative to one another. As for the first points of articulation, a second upper point of articulation 92A and a second lower point of articulation 92B are therefore also defined.

An upper movement push rod 86 is articulated to the stationary partition 12 and the leaf 20 by means of the upper points of articulation 90A, 92A. A lower movement push rod 88 is articulated to the fixed partition 12 and the leaf 20 by means of the lower points of articulation 90B, 92B.

The first points of articulation 90A, 90B together define a first direction, and the second points of articulation 92A, 92B together define a second direction, which is substantially parallel to the first direction. Furthermore, the gap between the first points of articulation 90A, 90B is substantially equal to the gap between the second points of articulation 92A, 92B. In this way, the points of articulation 90A, 90B, 92A, 92B form the four apices of a first parallelogram.

As a result, the push rods 86, 88 are substantially parallel to one another and are adapted to remain substantially parallel when the leaf 20 moves from the open position to the closed position thereof. Furthermore, the lengths separating the first and second points of articulation, 90A, 92A, 90B, 92B, respectively, of each push rod 86, 88, respectively, are substantially equal.

The mechanism 82 is thus substantially in the form of a parallelogram.

It will be noted that, in the illustrated example, the first and second points of articulation 90A, 90B, 92A, 92B make up the ends of each push rod 86, 88. It will also be noted that the lengths of the push rods 86, 88 are substantially equal.

The connecting element 94 comprises a support 96, secured to the mechanism 82, and a clamp 98, secured to the first leaf portion 22, sandwiching the support 96.

The support 96 is substantially trapezoidal. It comprises a body 100, extending inside the clamp 98, and two stationary arms 102A, 102B extending transversely from the body 100 toward the inside of the partition 12.

The arms 102A, 102B comprise an upper arm 102A, articulated to the upper movement push rod 86, and a lower arm 102B, articulated to the lower movement push rod 88.

The upper arm 102A is substantially rectilinear. It comprises a first end 104 for connecting to the body 100, and a second end 106 opposite the first end 104. The second upper point of articulation 92A is positioned at the second end 106.

The lower arm 102B comprises a main segment 108 for connecting to the body 100, which is substantially rectilinear, and a bent end segment 110. The second lower point of articulation 92B is positioned at an end of the end segment 110 opposite the end for connecting the segment 110 to the main segment 108.

This trapezoidal configuration of the support 96 makes it possible to form an interval for receiving the lower push rod 88 between the arms 102A, 102B when the push rod 20 is in the open configuration.

The mechanism 82 also comprises a coordinating push rod 120 articulated to each of the movement push rods 86, 88. Each movement push rod 86, 88, respectively, is articulated to the coordinating push rod 120 by a third point of articulation 122A, 122B, respectively.

This coordinating push rod 120 makes it possible to ensure continuity of the movement of the leaf 20 when the first and second points of articulation 90A, 90B, 92A, 92B are aligned with one another.

For each movement push rod 86, 88, the first 90A, 90B, second 92A, 92B and third 122A, 122B points of articulation are not aligned. In particular, for each movement push rod 86, 88, respectively, the third point of articulation 122A, 122B, respectively, is upwardly offset relative to the line defined by the first and second points of articulation 90A, 92A, 90B, 92B, respectively, when the leaf 20 is in the closed position.

For each movement push rod 86, 88, the distance separating the third point of articulation 122A, 122B from the first point of articulation 90A, 90B is smaller than the distance separating the third point of articulation 122A, 122B from the second point of articulation 92A, 92B.

The third points of articulation 122A, 122B together define a third direction, which is substantially parallel to the first direction. The mechanism 82 is adapted so that the third direction remains substantially parallel to the first direction all throughout the movement of the leaf 20.

In particular, the third points of articulation 122A, 122B define the apices of a second parallelogram with the first points of articulation 90A, 90B. In this way, irrespective of the position of the leaf 20, at least one of the first and second parallelograms is not flat. This guarantees that the movement of the leaf 20 will continue.

Figure 5:
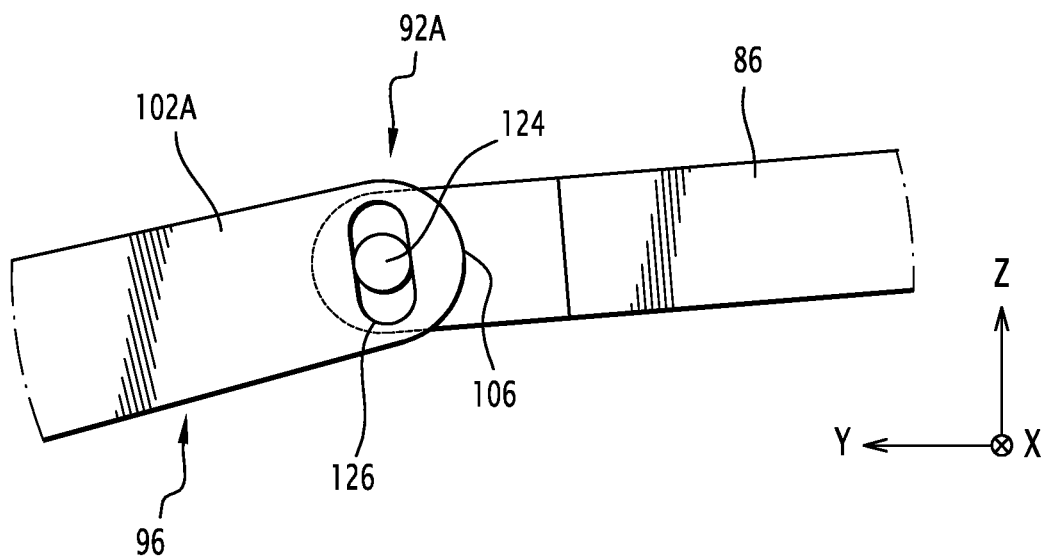
FIG. 5 is a view of a detail marked V in FIG. 1.

As shown in FIG. 5, the second upper point of articulation 92A is formed by the cooperation of a finger 124 with an oblong opening 126.

The finger 124 is supported by the push rod 86. It extends through the oblong opening 126. It is oriented longitudinally. It typically extends between two flanges (not shown) of the push rod 86.

The oblong opening 126 is formed in the support 96. It is oriented longitudinally. It passes through the support 96 and emerges in a front surface and a rear surface (not shown) thereof. The oblong opening 126 is elongated parallel to the third direction.

Alternatively, the oblong opening 126 is replaced by an elastic element of the silent block type, or by a push rod inserted between the arm 102A and the connecting rod 86.

In this way, a degree of translational freedom between the push rod 86 and the support 96 is formed at the second upper point of articulation 92A. This makes it possible to offset any length defects of the pieces 86, 88, 96, 120 of the mechanism 82 and allows functional play during the movement of the leaf 20. This also facilitates the assembly of the elements of the mechanism 82 during manufacture of the separating element 10.

Alternatively, by replacing the degree of translational freedom formed at the second upper point of articulation 92A, a degree of translational freedom between the push rod 88 and the support 96 is formed at the second lower point of articulation 92B. This degree of freedom is for example formed by the cooperation of a finger and an oblong opening, or by an elastic element of the silent block type, or by a push rod inserted between the arm 102B and the push rod 88.

Returning to FIG. 1, the movement rail 84 is substantially rectilinear and extends substantially horizontally. It is secured to the partition 12. It is adapted to cooperate with a guided member (not shown) of the leaf portion 24 to guide the leaf portion 24 along the transverse axis Y.

The movement means 80 also comprise means 97 for compensating for the weight of the first leaf portion 22 on the mechanism 82. These compensating means 97 comprise a gas cylinder 98 articulated, at a first end, to a point of the partition 12, and, at the second end, to one of the push rods 86, 88. Alternatively, a spring-loaded actuator is substituted for the gas cylinder 98.

Furthermore, the movement means 80 are motorized. To that end, they comprise a motorized linear actuator 130 adapted to drive the movement of the leaf 20 via the mechanism 82.

The actuator 130 is fastened to the partition 12 and is articulated to one of the movement push rods 86, 88. In the illustrated example, it is articulated to the lower push rod 88, via a fourth point of articulation 132.

The fourth point of articulation 132 is placed close to the first lower point of articulation 90B. It is also placed close to the third point of articulation 122B. It is made up of a pivot link between the actuator 130 and the push rod 88, formed on a protuberance 134 of the lower push rod 88.

The actuator 130 is made up of a reversible motorized system allowing manual maneuvers in the event of a failure of the motor means or the power source controlling the motorized system, for example in case of electrical failure. In particular, in the illustrated example, the actuator 130 is made up of a screw-nut electric system.

The separating element 10 also comprises means 140 for limiting the travel of the leaf 20 in the direction of circulation C.

Figure 6:
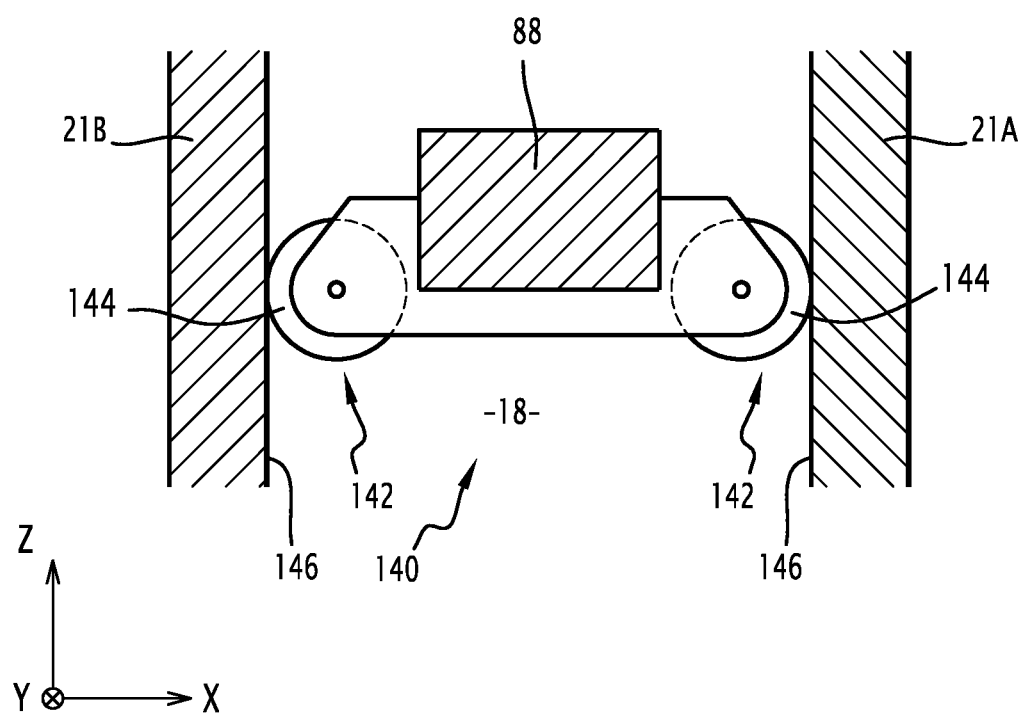
FIG. 6 is a cross-sectional view along a plane marked VI in FIG. 1.

As illustrated by FIG. 6, the limiting means 140 comprise protrusions 142 secured to the lower movement push rod 88. Each protrusion 142 protrudes longitudinally from the plane of the mechanism 82 forward or backward.

The protrusions 142 are in particular grouped together in pairs, one protrusion 142 of each pair protruding longitudinally forward and the other protrusion 142 protruding longitudinally backward. The protrusions 142 of each pair are longitudinally aligned.

Each protrusion 142 is adapted to bear against a partition panel 21A, 21B of the stationary partition 12. In particular, each protrusion 142 is adapted to remain bearing against said partition panel 21A, 21B when the leaf 20 is moved from the open position to the closed position thereof. The mechanism 82 is thus longitudinally guided between the partition panels 21A, 21B when the leaf 20 is moved.

Preferably, each protrusion 142 comprises a roll 144, the roll 144 defining a bearing surface against the associated partition panel 21A, 21B. The roll 144 is adapted to roll against a rolling surface 146 defined by said associated partition panel 21A, 21B, when the leaf 20 is moved from the open position to the closed position thereof. To that end, the axis of each roll 144 is preferably oriented parallel to the direction of extension of the movement rod 88. In this way, the friction of the protrusions 142 against the partition panels 21A, 21B is reduced.

Preferably, each roll 144 is made from a flexible material, typically elastomer.

Figure 10:
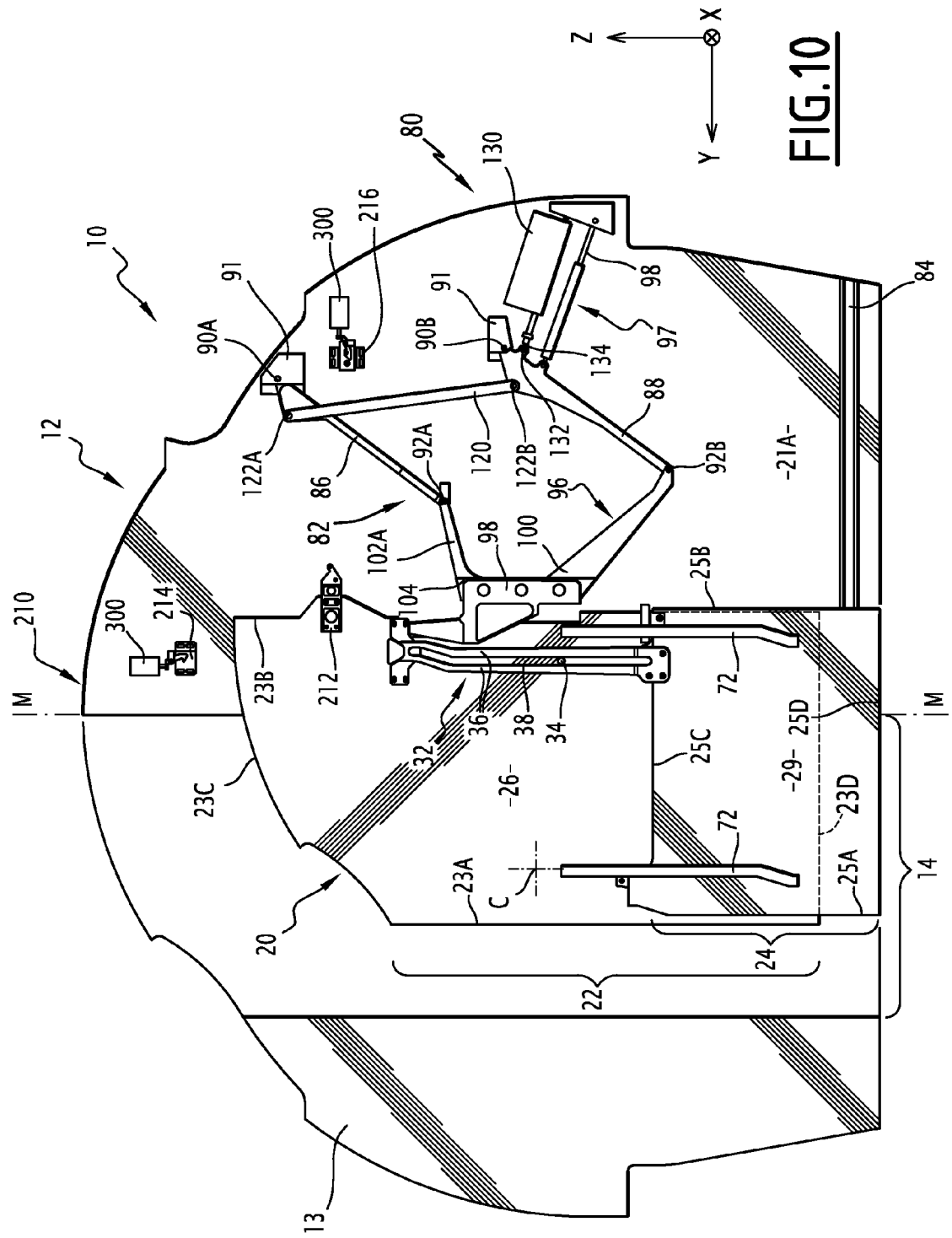
FIG. 10 is a view similar to FIG. 1, the leaf being in an intermediate position.
Figure 11:
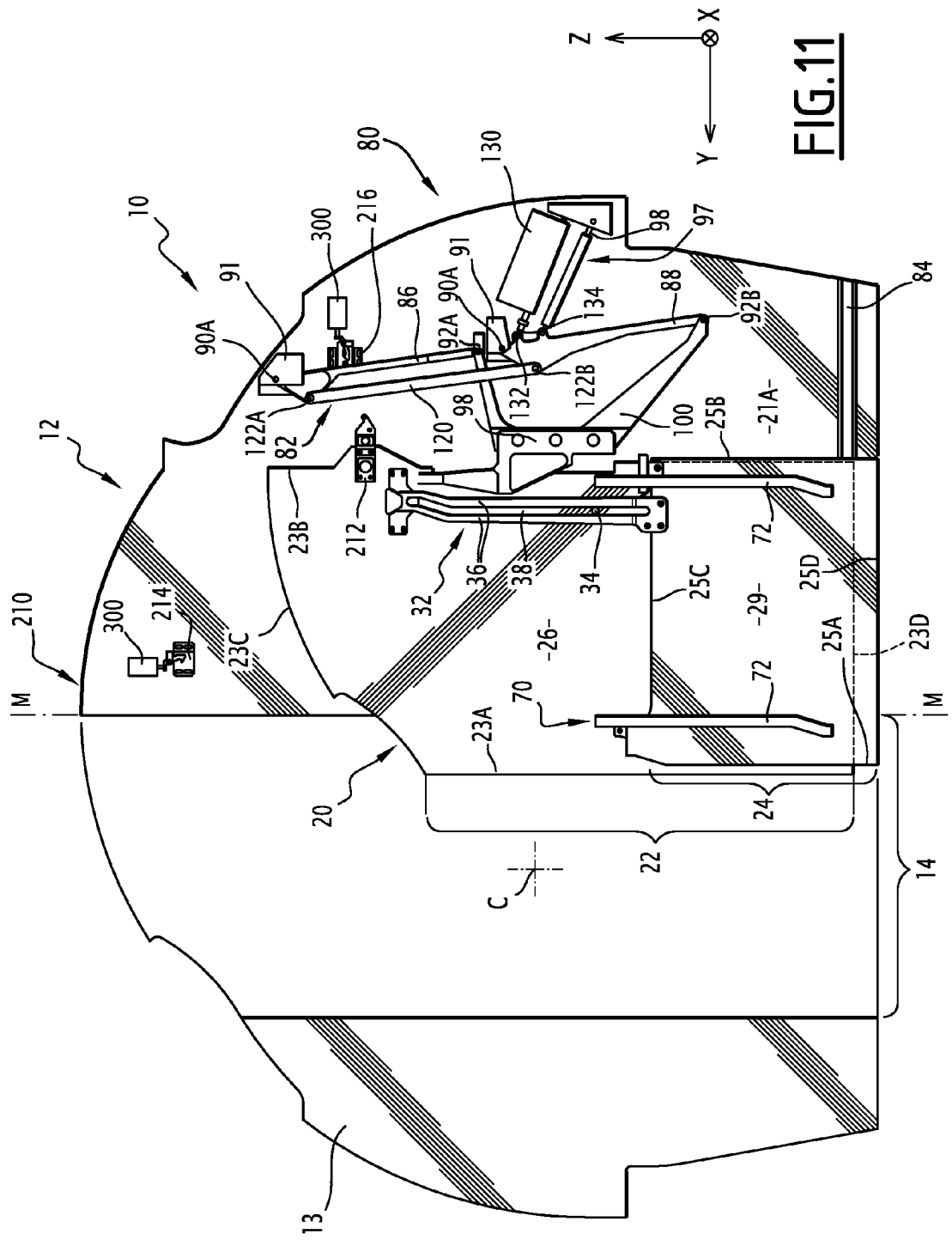
FIG. 11 is a view similar to FIG. 1, the leaf being in a further intermediate position.
Figure 12:
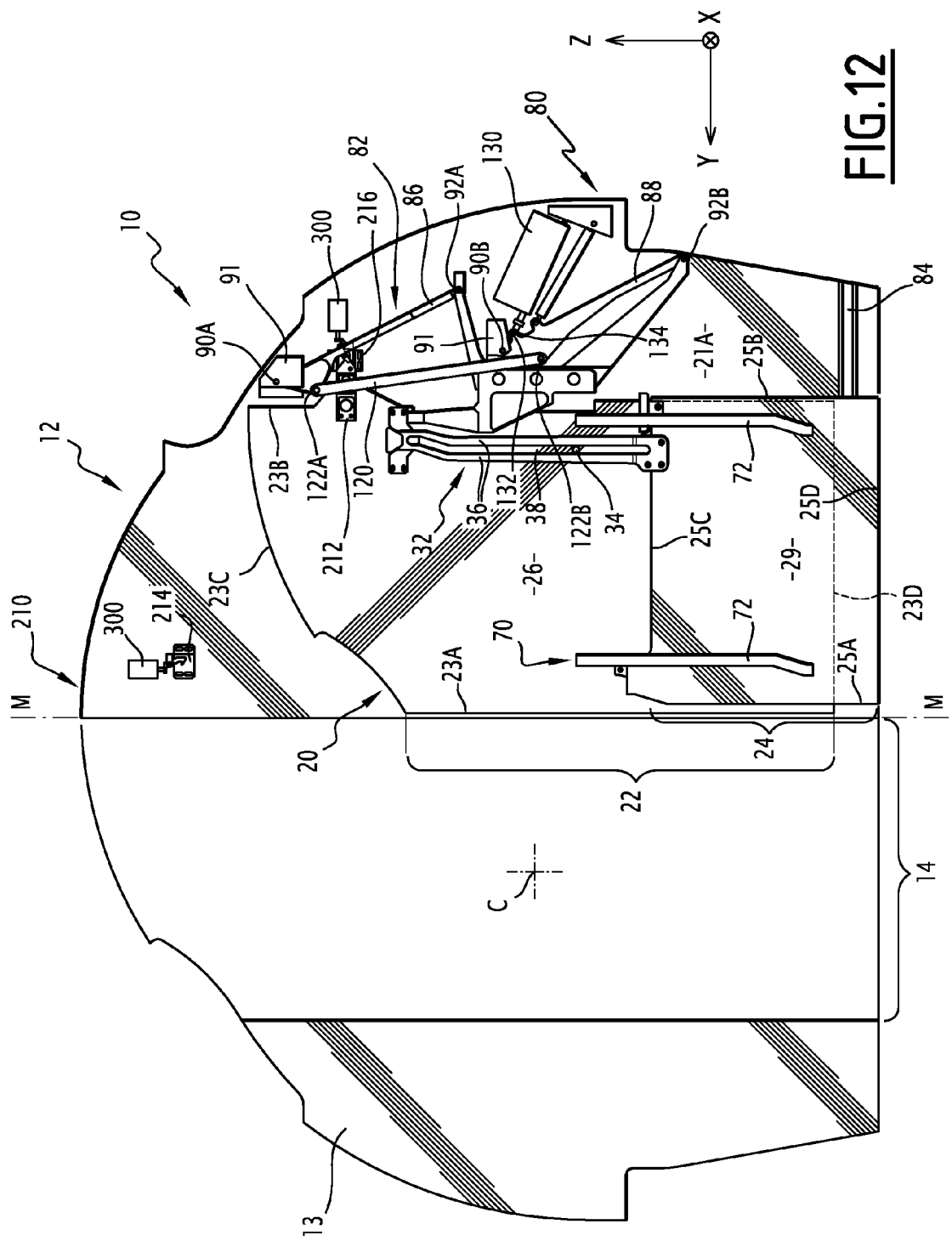
FIG. 12 is a view similar to FIG. 1, the leaf being in the open position.

It will be noted that, for simplification reasons, the limiting means 140 have been omitted from FIGS. 10 to 12.

The separating element 10 also comprises a system 210 for locking the leaf 20 in the open and closed positions. This locking system 210 comprises a movable locking member 212 secured to the leaf 20, two stationary locking members 214, 216 secured to the partition 12, a device 218 for manually actuating a movable locking member 212, and devices 300 for automatically actuating the stationary locking members 214, 216.

A first stationary locking member 214 is adapted to cooperate with the movable locking member 212 to lock the leaf 20 in the closed position. A second stationary locking member 216 is adapted to cooperate with the movable locking member 212 to lock the leaf 20 in the open position.

As shown in FIG. 1, the stationary locking members 214, 216 have identical structures oriented perpendicular to one another.

Figure 7:
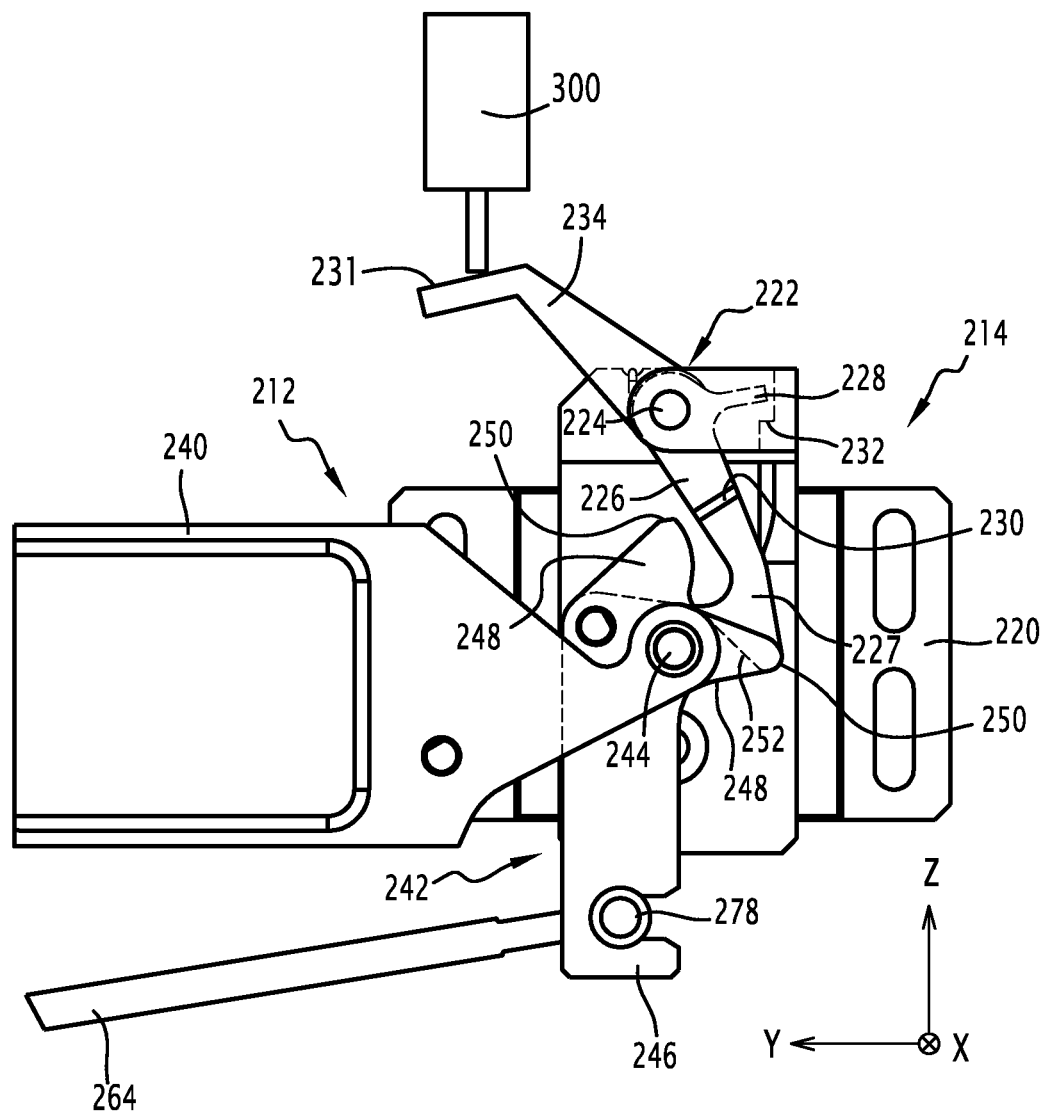
FIG. 7 is a view of a detail marked VII in FIG. 1.
Figure 8:
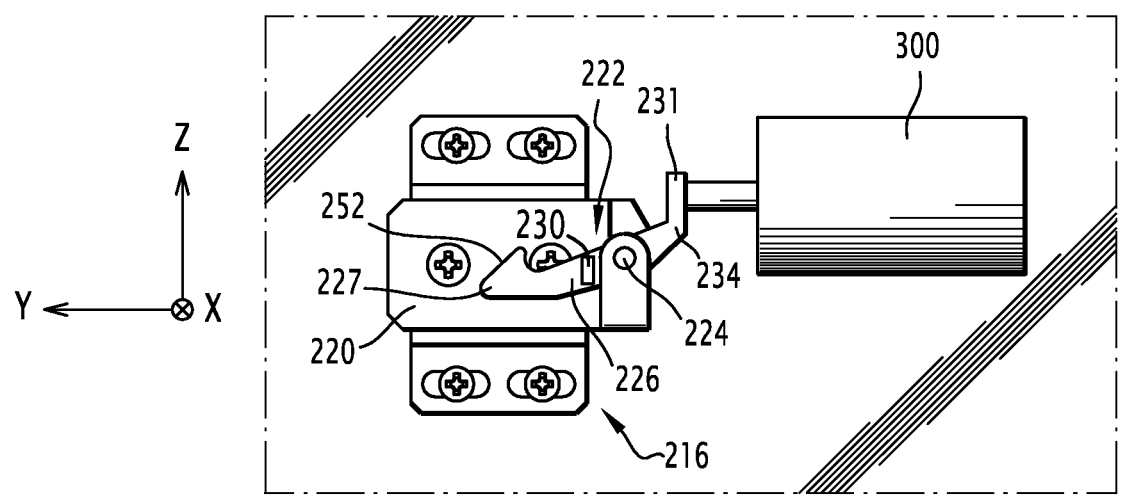
FIG. 8 is a view of a detail marked VIII in FIG. 1.

In reference to FIGS. 7 and 8, each stationary locking member 214, 216 comprises a platen 220 for fastening on the partition 12, a fastening member 222, articulated to the platen 220, and an articulation shaft 224 of the fastening member 222.

The platen 220, the fastening member 222 and the shaft 224 are identical for the two stationery locking members 214, 216. The orientation of the platen 220 of the stationery locking member 214 differs from that of the platen 220 of the stationery locking member 216. In particular, these orientations form an angle substantially equal to 90° between them.

The fastening member 222 comprises a body 226, comprising a first end 227 forming a hook, curved from a first side of the body 226, a fin 228 protruding transversely from the body 226, from a second side of the body 226, opposite the first side, a projection 230 longitudinally protruding from the body 226, and an appendage 231, protruding transversely from the second end 234 of the body 226 toward the first side. For the first stationary locking member 214, the first side is the left side of the body 226. For the second stationary locking member 216, the first side is the upper side of the body 226.

The fastening member 222 is adapted to pivot on the shaft 224 between an idle position, in which the fin 228 bears against a stop surface 232 of the platen 220, and a retracted position, in which the fin 228 is spaced away from the stop surface 232.

Each stationary locking member 214, 216 also comprises means (not shown) for returning the fastening member 222 to its idle position. The return means are typically made up of a spring positioned around the shaft 224.

In its idle position, the fastening member 222 of the first stationary locking member 212 is oriented substantially vertically, opposite the passage 14. In the idle position thereof, the fastening member 222 of the second stationary locking member 214 is oriented substantially horizontally, upwardly.

Each automatic actuating device 300 is adapted to exert a force on the fastening member 222 of a stationary locking member 214, 216, so as to stress the fastening member 222 in its retracted position. In particular, the actuating device 300 is adapted to exert a force on the appendage 231, oriented toward the first end 227 so that, under the effect of that force, the fastening member 222 pivots around the associated shaft 224.

Each actuating device 300 is preferably made up of a motorized linear actuator.

In reference to FIG. 7, the movable locking member 212 comprises an arm 240 fastened on the leaf 20 and a lever 242 articulated on the arm 240.

The lever 242 is elongated. It is adapted to pivot relative to the arm 240 between an idle position, in which it is oriented substantially vertically, and an unlocked position, in which it is inclined relative to the vertical direction Z.

The lever 242 comprises a finger 244 adapted to cooperate with the fastening member 222 of each stationary locking member 214, 216 to lock the leaf 20 in the open or closed position. The finger 244 is stationary relative to the arm 240. The finger 244 defines the hinge pin of the lever 242 relative to the arm 240.

In the locked configuration of the leaf 20, the finger 244 is engaged in the hook formed by the first end 227 of the body 226 of the fastening member 222.

The lever 242 also comprises two flanges 246 framing the finger 244, each flange 246 being oriented substantially perpendicular to the finger 244. A flange 246 comprises two distinct appendages 248 each defining a cam surface 250. Each cam surface 250 is adapted to cooperate with the respective extension 230 of the fastening member 222 of one of the stationery locking members 214, 216 when the lever 242 is in the unlocked position, so as to stress the fastening member 222 toward the retracted position thereof.

Owing to this configuration of the lever 242, it is possible to use stationary locking members 214, 216 having identical structures, which makes it possible to reduce the manufacturing costs of the locking system 210.

The first end 227 of the body 226 of each fastening member 222 also defines an inclined sliding surface 252 of the finger 244. This surface 252 is configured so that, when the finger 244 bears against said surface 252, as shown in FIG. 7, the finger 244 exerts a force on the fastening member 222 that stresses the latter toward the retracted position thereof.

The manual actuating device 218 is provided to be able to open the leaf 20 in the event of a failure of the electrical system of the aircraft. For simplification reasons, the actuating device 218 has been omitted from FIGS. 10 to 12.

Figure 9:
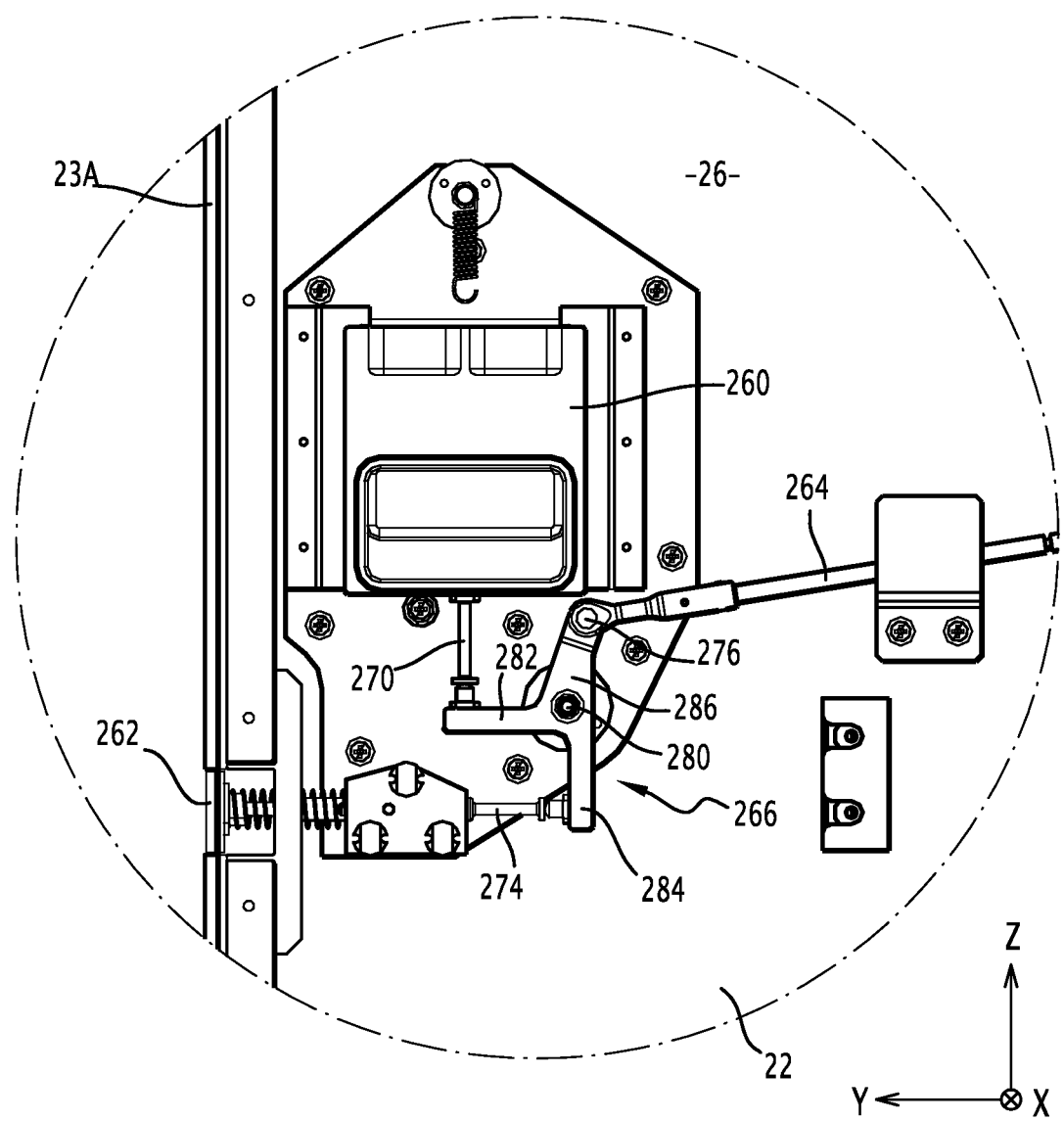
FIG. 9 is a view of a detail marked IX in FIG. 1.

In reference to FIG. 9, the manual actuating device 218 is mounted on the first leaf portion 22. It comprises an actuating handle 260, a release button 262, a transmission push rod 264, and a bar 266 mechanically connecting the handle 260 and the button 262 to the push rod 264.

The handle 260 is movably mounted in vertical translation on the leaf portion 22. It is connected to the bar 266 by a connecting rod 270. The handle 260 is accessible only by the front 23E and rear 23F surfaces of the leaf portion 22. To that end, an opening (not shown) is formed in the front 23E and rear 23F surfaces of the leaf portion 22 to allow a user to grasp the handle 260.

The button 262 is placed on the inner lateral edge 23A of the leaf portion 22, in the trench thereof. It is accessible only through the trench of the leaf portion 22. It is connected to the bar 266 by a connecting rod 274.

The push rod 264 comprises a first point of articulation 276 on the bar 266, and a second point of articulation 278 (FIG. 7) on the lever 242 of the movable locking means 212.

The bar 266 is articulated on the leaf portion 22. It is pivotably mounted around a substantially longitudinal axis.

The bar 266 is generally in the shape of a T or a star with three branches. More generally, it is in the shape of a part with three arms connected to a central point 280 through which the hinge pin of the bar 266 passes on the leaf portion 22.

The bar 266 is connected by the free end of each of its arms, respectively, to the handle 260, the button 262, and the push rod 264. In particular, the free end of a first arm 282 is connected to the handle 260 using the rod 270, the free end of a second arm 284 is connected to the button 262 using the rod 274, and the free end of the third arm 286 constitutes a point of articulation 276 of the push rod 264 on the bar 266.

The bar 266 is adapted so that actuating the handle 260 or the button 262 causes the bar to rotate in the trigonometric direction and, subsequently, causes the point of articulation 278 to move.

A method for unlocking the leaf 20 using the manual actuating device 218 will now be described, in reference to FIGS. 7 and 9.

When the leaf 20 is in the closed position, a user actuates the handle 260 by pulling it downward. In so doing, the bar 266 pivots around its axis in the trigonometric direction and the point of articulation 278 of the push rod 264 is moved to the left.

Under the effect of this movement, the lower end of the lever 242 is pulled to the left, which causes the incline of the lever 242. A cam surface 250 then bears against the extension 230 of the fastening member 222, which causes the fastening member 222 to move into its retracted position. The fastening member 222 is then freed from the finger 244, which can be translated downwardly. The leaf 20 is then unlocked.

When the leaf 20 is in the open position, the handle 260 is not accessible. It is then no longer possible to unlock the leaf 20 by actuating the handle 260.

To unlock the leaf 20 when it is in the open position, the user must therefore push on the button 262. This is then accessible, as it is positioned on the trench of the leaf 20. In so doing, the bar 266 pivots around its axis in the trigonometric direction and the point of articulation 278 of the push rod 264 is moved to the left. The unlocking method is then similar to that described above.

A method for opening the leaf 20 will now be described, in light of FIGS. 1 and 7 to 12.

First, the leaf 20 is locked in the closed position thereof, as shown in FIG. 1. It is therefore first unlocked.

To that end, a current is injected into the actuating device 300 associated with the stationary locking member 214, under the effect of which the actuating device 300 bears on the protuberance 231. Under the effect of this bearing, the fastening member 222 pivots around the shaft 224 toward the retracted position thereof. The first end 227 is then disengaged from the finger 244. The fastening member 222 then no longer prevents the finger 244 from being moved downward. The movable locking member 212 is thus downwardly translationally free. The leaf 20 is unlocked.

Then the actuator 130 is activated and stresses the lower movement push rod 88 so as to pivot it in the trigonometric direction around the point of articulation 90B. Part of the force exerted by the actuator 130 is also transmitted to the upper movement push rod 86 using the support 96 and the coordinating push rod 120. Under the effect of this force, the upper push rod 86 also pivots around the point of articulation 90A so as to remain parallel to the lower push rod 88. In particular, the direction of rotation of the upper push rod 86 around the point of articulation 90A is the same as the direction of rotation of the lower push rod 88 around the point of articulation 90B.

During the movement of the leaf 20, the movement push rods 86, 88 of the mechanism 82 thus remain parallel to one another. More generally, the mechanism 82 remains generally in the shape of a parallelogram and thus maintains the orientation of the first leaf portion 22 relative to the stationary partition 12. The first leaf portion 22 thus preserves its orientation within the transverse plane, and in particular remains vertical.

In particular, the second point of articulation 92A, 92B of each movement push rod 86, 88 follows a trajectory in the shape of an arc of circle centered on the first point of articulation 90A, 90B of said push rod 86, 88. The first leaf portion 22 therefore follows a substantially arc of circle-shaped movement inside the transverse plane.

Near the closed position, the first leaf portion 22 thus has a substantially exclusively vertical movement, during which it starts to fit into the second leaf portion 24.

During this step, the movement member 48 bears against the inclined portion 62 of the guide 44 and the guiding member 34 bears against one of the bars 36 of the slide 32, thereby stressing the second leaf portion 24 transversely, which causes the transverse movement of the latter relative to the first leaf portion 22. The movement member 48 then continues to descend along the guide 44 and, when it reaches the lower portion 64 of the guide 44, the relative movement of the leaf portions 22, 24 becomes exclusively vertical.

The leaf 20 then successively passes through a first intermediate position, as shown in FIG. 10A, in which the first 90A, 90B and second 92A, 92B points of articulation of each movement push rod 86, 88 together define a vertical axis. The leaf 20 then passes through a second intermediate position flattening the first parallelogram, as shown in FIG. 11, in which the first 90A, 90B and second 92A, 92B points of articulation of the two movement push rods 86, 88 are aligned with one another.

In the second intermediate position, the second parallelogram is not flattened, so that the movement of the leaf 20 can continue beyond the second intermediate position without a risk of blocking the mechanism 82.

Beyond the second position, the parallelogram formed by the points of articulation 90A, 92A, 90B, 92B reverses itself relative to the parallelogram formed below the second position. In particular, below the second position, the second points of articulation 92A, 92B are situated on the first side of the line passing through the first points of articulation 90A, 90B. Beyond the second position, the second points of articulation 92A, 92B are situated on a second side of the line passing through the first points of articulation 90A, 90B.

These kinematics make it possible to maximize the travel of the leaf 20 while being compatible with the limited space available for that travel in the fuselage.

Near the first intermediate position, the movement of the first leaf portion 22 is substantially exclusively horizontal. The second leaf portion 24 is then largely retracted inside the first leaf portion 22, and the first leaf portion 22 is at its lowest.

For the end of the opening movement, between the first intermediate position and the open position, the first leaf portion 22 rises while the leaf 20 finishes retracting inside the partition 12. The leaf 20 crosses the second intermediate position, then the movable locking member 212 finally comes into contact with the second stationary locking member 216 to lock the leaf 20 in the open position.

To finish, a method for closing the leaf 20 will be described, in light of FIGS. 1 and 10 to 12.

The leaf 20 is first unlocked, as described above. The actuator 130 is then deployed and stresses the lower push rod 88 so as to pivot it in the clockwise direction around the point of articulation 90B. The movement is transmitted to the push rod 86, which pivots around the point of articulation 90A, by the support 96 and by the coordinating push rod 120. The push rods 86, 88 thus remain parallel to one another.

As in the opening method, the leaf portion 22 follows a substantially arc of circle-shaped path while preserving its vertical orientation. The direction of travel of this path is, however, reversed.

The guide 42 bears against the movement member 46. At the same time, the guiding member 34 bears against one of the bars 36 of the slide 32. These forces exerted on the elements secured to the second leaf portion 24 cause the transverse movement of the leaf portion 24. The latter is then deployed outside the space 28.

During this deployment of the leaf portion 24, the guiding member 34 rises inside the slit 38 of the slide 32. At the same time, the movement members 46, 48 roll against the associated guides 42, 44, so as to control the relative transverse position of the leaf panels 22, 24. Lastly, the skates 74 slide against the slip bands 72, so as to avoid any longitudinal travel of the leaf portion 24 relative to the open portion 22.

Lastly, the leaf 20 reaches its closed position, and the movable locking member 212 comes into contact with the first stationary locking member 214 to lock the leaf 20 in the closed position.

Owing to the invention, the movement travel of the leaf 20 is maximized. It is thus possible to form a wide passage 14 in the separating element 10.

Furthermore, the mechanism 82 is particularly light and takes up less space when the leaf 20 is in the retracted configuration.

Additionally, the travel of the leaf portions 22, 24 relative to one another is limited, which makes it possible to improve the qualitative output of the separating element 10.

The mechanism 82 is thus easy to maneuver, has reduced blockage risks, and requires less maintenance.

Lastly, the motor means for the movement means 80 are particularly easy to install, as they only require actuators that are readily commercially available and inexpensive.

In the description provided above, the leaf 20 retracts inside the right partition 12. In one alternative, the leaf 20 retracts inside the left partition 13. The description provided above also applies to this case, the orientation terms "left" and "right" on the one hand, and "trigonometric" and "clockwise" on the other hand, then simply needing to be inverted.

Furthermore, in the description provided above, the separating element 10 is installed between the fuselage and a cabin floor. In one alternative, the separating element 10 is installed between the fuselage and a cabin ceiling. The description provided above also applies to this case, the orientation terms "upper" and "lower" on the one hand, and "trigonometric" and "clockwise" on the other hand, then simply needing to be inverted.

What is claimed is:

1. A separating element for a platform cabin, comprising:
   at least one stationary partition adapted for delimiting a passage inside the cabin,
   at least one leaf mounted transversely movable relative to the passage between a closed position, in which it extends through the passage, and an open position, in which it is positioned at least partially spaced away from the passage, and
   a movement mechanism configured to move the at least one leaf between the closed position and the open position thereof,
   the at least one leaf being adapted to move along a plane transverse to the passage,
   wherein the movement mechanism comprises at least one movement push rod articulated by a first point of articulation to the stationary partition, the first point of articulation being a stationary point of the stationary partition, and by a second point of articulation to a connecting element, wherein the entire connecting element is fixed relative to at least a portion of the at least one leaf, and wherein, in at least a first position of the at least one leaf, the first and second points of articulation are aligned along a vertical axis which is perpendicular to a floor of the platform cabin, and wherein, when the at least one leaf is in the open position, the geometrical center of the leaf is on the same side, relative to the vertical axis passing through the first point of articulation, as when the at least one leaf is in the closed position.

2. The separating element according to claim 1, wherein the at least first position comprises a first intermediate position of the at least one leaf between the closed and open positions thereof.

3. The separating element according to claim 1, wherein one of the first and second points of articulation has a degree of freedom perpendicular to a hinge pin.

4. The separating element according to claim 1, wherein the at least one leaf has a width, defined in a horizontal axis perpendicular to the vertical axis, which is between 20 percent and 30 percent of the width of the separating element, defined in the horizontal axis.

5. The separating element according to claim 1, comprising a locking system configured to lock the at least one leaf in the open position and in the closed position, the locking system comprising a movable locking member secured to the at least one leaf and two stationary locking members secured to the partition, one stationary locking member cooperating with the movable locking member to lock the at least one leaf in the open position, and the other stationary locking member cooperating with the movable locking member to lock the at least one leaf in the closed position.

6. The separating element according to claim 1, wherein the at least one leaf comprises a first leaf portion and a second leaf portion movable relative to each other, the connecting element being fixed relatively to the first leaf portion, and the at least one leaf further comprises a guide configured to guide relative movement of the first and second leaf portions of the at least one leaf, said guide comprising a first guiding means connected to the first leaf portion and a second guiding means connected to the second leaf portion, said first and second guiding means being adapted to cooperate with each other.

7. The separating element according to claim 1, wherein the at least one partition comprises two stationary partitions delimiting the passage between them, and the at least one leaf has a single leaf to obstruct the passage.

8. The separating element according to claim 7, wherein the passage is transversely offset relative to a vertical centerline of the separating element.

9. The separating element according to claim 1, wherein one of the first and second points of articulation is formed by the cooperation of a finger with an oblong opening.

10. The separating element according to claim 1, wherein the position of a top edge of the leaf when the leaf is in the closed position is vertically offset relative to the position of the top edge when the leaf is in the open position.

11. The separating element according to claim 1, wherein the position of a bottom edge of the leaf when the leaf is in the closed position is vertically offset relative to the position of the bottom edge when the leaf is in the open position.

12. The separating element according to claim 1, comprising a guiding element to guide at least a portion of the at least one leaf so that said portion follows a substantially arc of circle-shaped movement between the closed and open positions of the at least one leaf.

13. A separating element for a platform cabin, comprising:
at least one stationary partition, adapted for delimiting a passage inside the cabin,
at least one leaf mounted transversely movable relative to the passage between a closed position, in which it extends through the passage, and an open position, in which it is positioned at least partially spaced away from the passage, and
a movement mechanism configured to move the at least one leaf between the closed position and the open position thereof,
the at least one leaf being adapted to move along a plane transverse to the passage, wherein the movement mechanism comprises two movement push rods, each of which is articulated by a first point of articulation to the stationary partition, and by a second point of articulation to a connecting element jointly movable with the at least one leaf, and wherein, in a first position of the at least one leaf, the first and second points of articulation of each movement push rod are aligned along a vertical axis, and
wherein the first point of articulation of each movement push rod is spaced apart from the first point of articulation of the other movement push rod and the second point of articulation of each movement push rod is spaced apart from the second point of articulation of the other movement push rod, and wherein, in a second position of the at least one leaf, the first and second points of articulation of each movement push rod are aligned with the first and second points of articulation of the other movement push rod in a manner that the four points of articulation align with each other.

14. The separating element according to claim 13, wherein the at least one second position comprises a second intermediate position of the at least one leaf between the closed and open positions thereof.

15. The separating element according to claim 14, wherein, between the closed position and the second intermediate position, the second points of articulation are situated on a first side of a line passing through both first points of articulation and wherein, between the second intermediate position and the open position, the second points of articulation are situated on the second side of the line passing through both first points of articulation.

16. The separating element according to claim 13, wherein the first points of articulation of the two movement push rods are vertically offset relative to one another.

17. The separating element according to claim 13, wherein the movement mechanism further comprises a coordinating push rod articulated to the two movement push rods.

18. The separating element according to claim 17, wherein each movement push rod is articulated to the coordinating push rod by a respective third point of articulation, and wherein, for each movement push rod, the third point of articulation is situated spaced away from a line passing through the first and second points of articulation of the movement push rod.

19. The separating element according to claim 18, wherein the first and third points of articulation together define the apices of a parallelogram.

20. A platform cabin comprising an enclosure which is at least partially cylindrical and a separating element, said separating element extending transversally to a direction of extension of the enclosure such that it separates the cabin into two compartments, said separating element comprising:
at least one stationary partition delimiting a passage inside the cabin,
at least one leaf mounted transversely movable relative to the at least one stationary partition between a closed position, in which it extends through the passage, and an open position, in which it is positioned at least partially spaced away from the passage, and a movement mechanism configured to move the at least one leaf between the closed position and the open position thereof, the at least one leaf being adapted to move along a plane transverse to the passage, wherein the movement mechanism comprises at least one movement push rod articulated by a first point of articulation to the stationary partition, and by a second point of articulation to a connecting element, wherein the entire connecting element is fixed relatively to at least a portion of the at least one leaf, and wherein, in at least a first position of the at least one leaf, the first and second points of articulation are aligned along a vertical axis which is perpendicular to a floor of the platform cabin, and wherein, when the at least one leaf is in the open position, the geometrical center of the leaf is on the same side, relative to the vertical axis passing through the first point of articulation, as when the at least one leaf is in the closed position.

* * * * *